U. WEDGE.
APPARATUS FOR PURIFYING FURNACE GASES.
APPLICATION FILED FEB. 6, 1909.
1,012,488.
Patented Dec. 19, 1911.
3 SHEETS—SHEET 2.
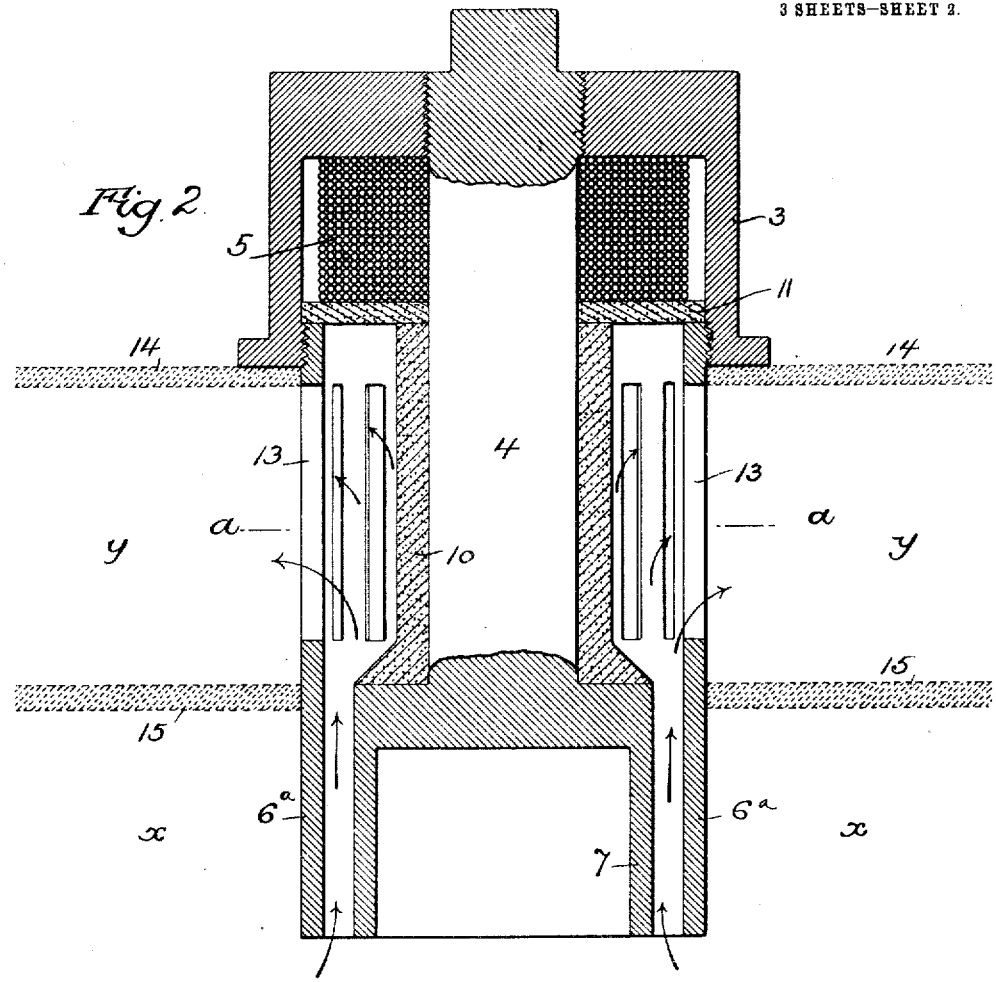
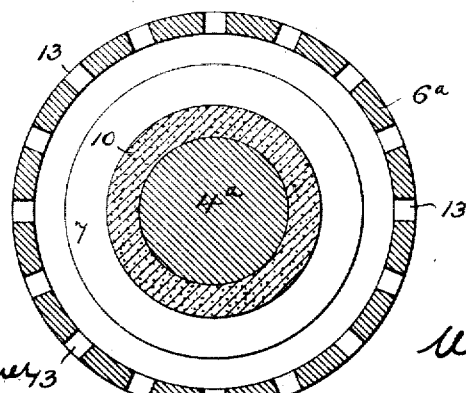

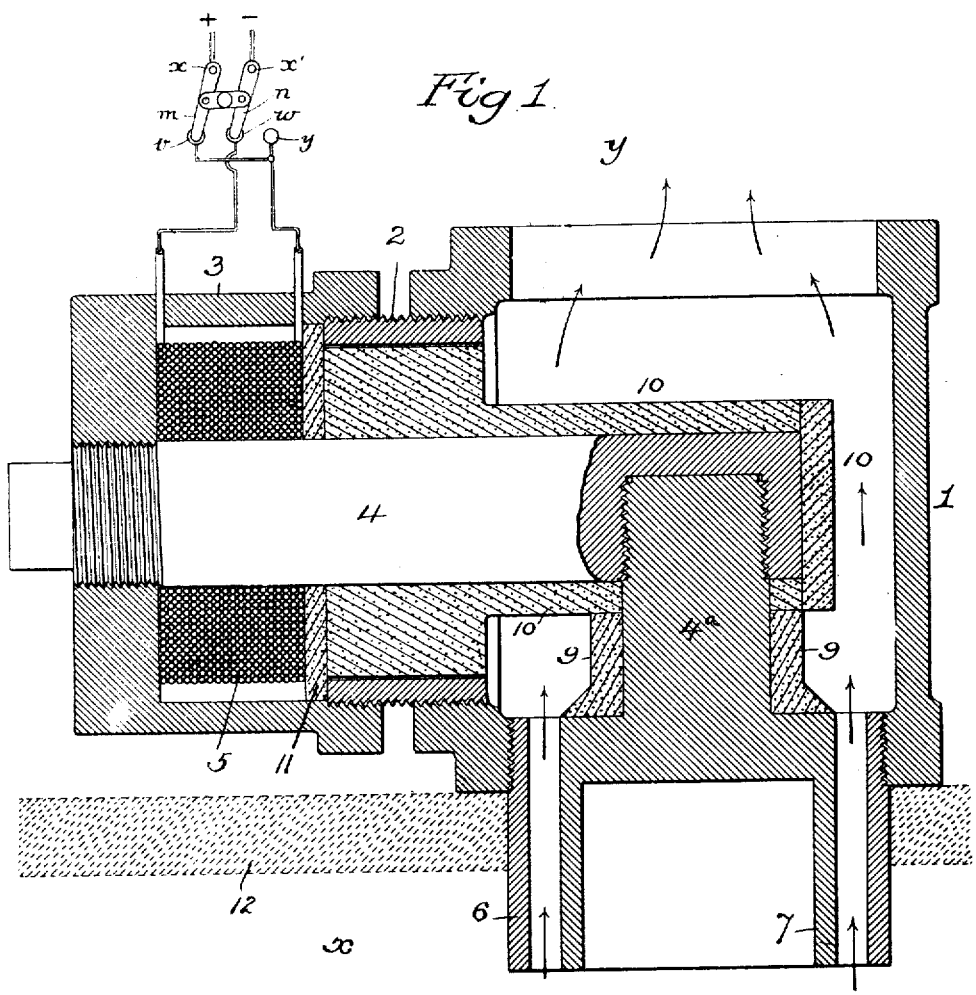

U. WEDGE.
APPARATUS FOR PURIFYING FURNACE GASES.
APPLICATION FILED FEB. 6, 1909.
1,012,488.
Patented Dec. 19, 1911.
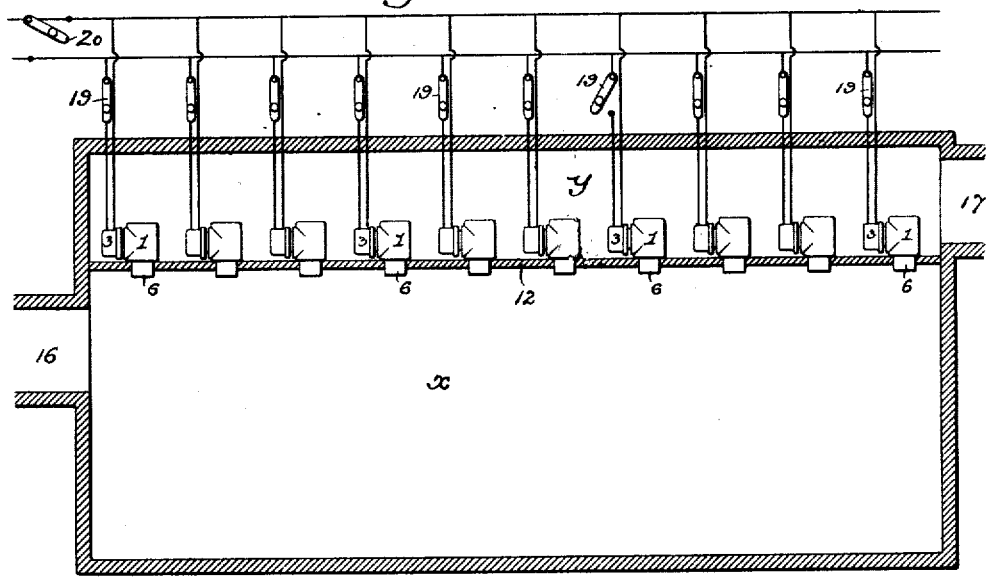
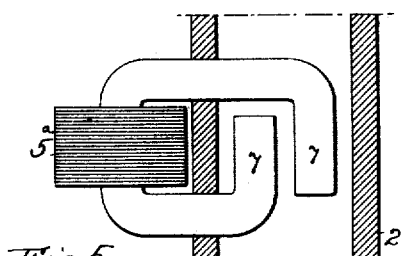
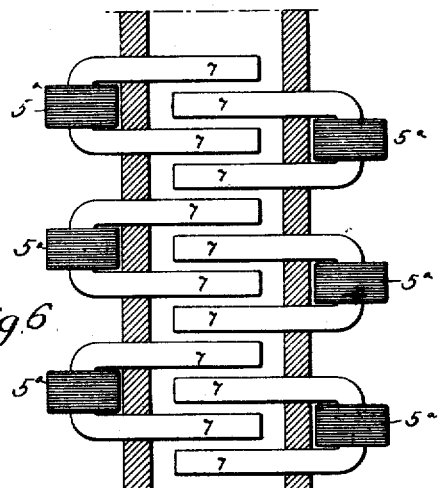
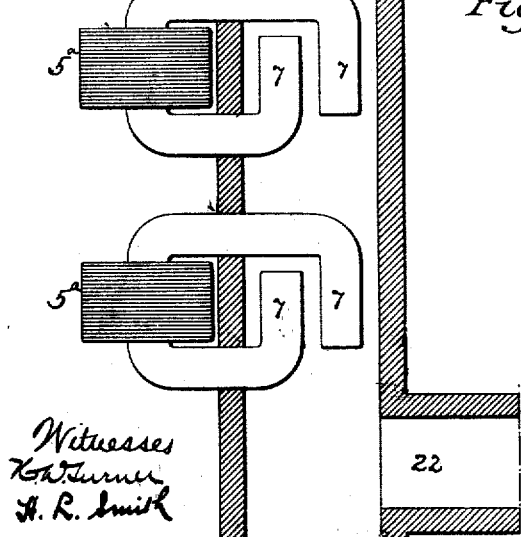

UNITED STATES PATENT OFFICE.

UTLEY WEDGE, OF ARDMORE, PENNSYLVANIA.

APPARATUS FOR PURIFYING FURNACE-GASES.

1,012,488.        Specification of Letters Patent.        Patented Dec. 19, 1911.

Application filed February 6, 1909. Serial No. 476,527.

*To all whom it may concern:*

Be it known that I, UTLEY WEDGE, a citizen of the United States, residing in Ardmore, Pennsylvania, have invented certain Improvements in Apparatus for Purifying Furnace-Gases, of which the following is a specification.

The object of my invention is to provide simple and effective means for purifying furnace or other gases or fluids (hereinafter referred to as "gas") by separating therefrom, particles (hereinafter referred to as "dust") held in mechanical suspension therein. This object I attain in the manner hereinafter set forth, reference being had to the accompanying drawings, in which—

Figure 1 is a view, partly in vertical section and partly in elevation, of a single purifier element constructed in accordance with my invention; Fig. 2 is a similar view illustrating a ther embodiment of the invention; Fig. is a horizontal section on the line $a$—$a$, Fig. ; Fig. 4 is a longitudinal sectional view of a gas purifying apparatus in which are employed a battery of elements of the character shown in Fig. 1, and Figs. 5 and 6 are sectional views illustrating certain modifications of my invention.

Most materials which are subjected to the action of roasting or like furnaces contain sulfid of iron which, when subjected to the furnace heat, is largely reduced to magnetic oxid or to lower sulfids of iron, which are also magnetic. When dust particles carried off by the gas from such furnaces are subjected to magnetic influence, the magnetic particles will be attracted and will also serve to trap or entrain non-magnetic particles and thus provide a means for removing from the gas practically all of the particles held in mechanical suspension therein.

I have ascertained that the customary high temperature of roasting furnace flue gases is not high enough to destroy the effectiveness of magnets subjected to such temperature but that, on the contrary, the efficiency of a steel magnet is even materially increased thereby. My invention has therefore been devised with the view of providing means for separating from these high temperature furnace gases, during their flow, the dust carried off by the gases from the furnace, and thereby, on the one hand, prevent such dust from interfering with the desired subsequent use of the gas, and, on the other hand, prevent waste of the dust, if the same has a commercial value.

Referring in the first instance to Fig. 1 of the drawing, 1 represents an ordinary T-coupling, into one branch of which is screwed a short pipe section 2 closed at its outer end by a cap 3 which carries the core 4 of an electro-magnet, the insulated wire wrapping or coil of the latter being represented at 5 and being contained within the cap 3. Another branch of the coupling 1 has screwed into it a short pipe section 6 and within the latter, but of somewhat less diameter than the same, is a hollow cylindrical pole piece 7 from which projects a core $4^a$ which is screwed into a threaded opening in the inner end of the core 4, and depends therefrom. Refractory and non-magnetic coverings 9 and 10 surround the magnet cores 4 and $4^a$, that portion of the covering 10 which is contained within the pipe section 2 being expanded in diameter so as to fill or almost fill said pipe section and a refractory washer 11 being seated upon the outer end of the pipe section 2, so that the dust is prevented from gaining access to the interior of the cap 3 in which the coil is contained. Any desired number of elements thus constructed are removably mounted upon a partition 12 between the receiving chamber $x$ and the discharge chamber $y$ of the casing of the purifier, such partition being shown by dotted lines in Fig. 1, so that the gas passes in the direction indicated by the arrows in said figure. When the magnet is energized by the passage of an electric current through the coil 5 any particles of dust contained in the gas and susceptible to magnetic attraction will, as the gas passes through the contracted space between the pole piece 7 and the pipe section 6 be attracted to such pole piece and will cling thereto as long as the magnet continues to be energized, but, as soon as the flow of current through the coil 5 is discontinued and the magnet is thereby deënergized, the particles adhering to the pole piece will drop therefrom and will be deposited in the receiving chamber below the partition 12, or the flow of current may be first reversed and then cut off in order to destroy any residual magnetism in the pole piece 7 which might be present if the flow of current through the magnet was simply cut off without first being thus reversed. In Fig. 1 I have shown an ordinary form of reversing switch comprising two line terminals $x$, $x'$ and three magnet terminals $v$, $w$ and $y$, a switch with two arms $m$ and $n$ being interposed between the line terminals and the magnet terminals, the magnet terminal $w$ being connected to one pole of the magnet coil and both of the terminals $v$ and $y$ being connected to the other pole of the same. Supposing that the arm $m$ of the switch leads from a positive line terminal and the arm $n$ from a negative line terminal, as shown in Fig. 1, the adjustment of the switch with its arm $m$ in contact with the magnet terminal $v$ and its arm $n$ in contact with the magnet terminal $w$, will cause the current to flow through the coil of the magnet in one direction but by shifting the switch so that its arm $m$ contacts with the terminal $w$ and its arm $n$ with the terminal $y$, the direction of flow of the current will be reversed. The periodical interruption, or reversal and interruption of the current flow may, in practice, be automatically effected by means under control of suitable time mechanism. If any dust passes the pole piece 7 from any cause such dust is prevented by the refractory and non-magnetic coverings 9 and 10 from adhering to the magnet cores 4 and 4ª, and thereby accumulating in a position where such accumulation is not desired. The period of time during which the magnet is deënergized need be but short but it is preferable to discontinue the flow of gas during such period in order to prevent it from carrying into the discharge chamber the particles of dust originally contained in it and other particles which it might carry off from the mass falling from the pole piece 7 into the receiving chamber of the apparatus.

The separator shown in Figs. 2 and 3 is of a simpler character than that shown in Fig. 1 and comprises a pipe section 6ª with slots 13 in its upper portion, the upper end of this pipe section being closed by the cap 3 and the magnet having a straight core 4 with hollow cylindrical pole piece 7 at the bottom. In this case the flanged lower end of the cap 3 may rest upon the roof 14 of the casing, and the pipe 6ª may project through a partition 15 in said casing, which partition serves to separate the receiving chamber $x$ from the discharge chamber $y$, the gas flowing through the contracted space between the pipe 6ª and the pole piece 7 and escaping through the slots 13 into the discharge chamber above the partition 15.

In practice a number of elements will usually be combined as a battery and in Fig. 4 I have illustrated one form of apparatus in which they are used in this way, the gas entering the receiving chamber $x$, below the partition 12 through the pipe 16 and escaping from the discharge chamber $y$, above said partition, through a pipe 17. In this case the coil of each magnet may be supplied with current by means of a pair of branch wires from a main line, as shown, one of the wires of each pair being provided with a switch 19 for establishing or interrupting the flow of current through the coil, or groups or sets of the magnets may be thus controlled independently of the others. Any element or element group of the series may thus be deënergized independently of the others in order to discharge the accumulated load of dust into the receiving chamber in the lower portion of the apparatus, or the entire battery of elements may have their magnets simultaneously deënergized by closing a switch 20 in the main line, the latter plan being the preferable one if the apparatus comprises a series of non-communicating chambers side by side and each provided with a battery of elements, or is otherwise so constructed that the flow of gas past the pole pieces of one deënergized battery may be cut off without interfering with the flow of gas past the pole pieces of the remaining energized batteries.

In Figs. 5 and 6 I have illustrated embodiments of my invention which are still simpler than that illustrated in Fig. 3, the device shown in each of these figures consisting of a pipe 21 for the flow of the dust-laden gas, this pipe containing the pole pieces 7ª of a number of electro-magnets disposed in succession in the direction of the flow and each having its coil 5ª on the outside of the pipe and therefore measurably free from the influence of the heat of the gas passing through the pipe. The dust-laden gas is introduced into the pipe through a branch 22 located below the magnets, and when the latter are deënergized the accumulated masses of dust adhering thereto will fall into that portion of the pipe below the branch 22 from which they can be removed as desired.

I claim:—

1. Gas purifying apparatus in which are combined an electro-magnet, means for causing the dust-laden gas to pass in proximity to the pole piece of said magnet, and heat resisting means for preventing access of the gas of the magnet core or coil.

2. Gas purifying apparatus in which are combined an electro-magnet having a hollow cylindrical pole piece, and means surrounding said pole piece and providing around it a passage of contracted area for the flow of the gas.

3. Gas purifying apparatus, in which are combined a casing having receiving and discharge chambers separated by a partition, and an electro-magnet having a pole piece occupying a passage formed in said partition, said electro-magnet being supported upon the partition but being unsecured thereto, whereby it is susceptible of being readily removed therefrom.

4. Gas purifying apparatus, in which are combined a casing having receiving and discharge chambers separated by a partition, and an element comprising an electro-magnet, and means for directing the dust-laden gas into proximity to the pole piece of said magnet, said element being supported upon said partition but being unsecured thereto, whereby it is susceptible of being readily removed therefrom.

5. Gas purifying apparatus in which are combined a plurality of electro-magnets, means for causing the dust-laden gas to flow in proximity to the pole pieces of said magnets, means for energizing the series of magnets, and means for deënergizing some of the magnets independently of the others.

6. Gas purifying apparatus in which are combined a plurality of electro-magnets, means for causing the dust-laden gas to flow in proximity to the pole pieces of said magnets, means for energizing the series of magnets, and means for deënergizing, simultaneously, the magnets of the series.

7. Gas purifying apparatus in which are combined a plurality of electro-magnets, means for causing the dust-laden gas to flow in proximity to the pole pieces of said magnets, means for energizing the magets of the series, means for deënergizing some of the magnets independently of the others, and means for simultaneously deënergizing all of the magnets of the series.

In testimony whereof, I have signed my name to this specification, in the presence of two subscribing witnesses.

UTLEY WEDGE.

Witnesses:
HAMILTON D. TURNER,
KATE A. BEADLE.